United States Patent
Bensberg et al.

(10) Patent No.: US 10,474,697 B2
(45) Date of Patent: Nov. 12, 2019

(54) UPDATING A PARTITIONING COLUMN

(71) Applicant: SAP SE, Walldorf (DE)

(72) Inventors: Christian Bensberg, Heidelberg (DE); Lars Fricke, Karlsruhe (DE); Martin Heidel, Walldorf (DE); Holger Bischoff, Walldorf (DE); Joern Schmidt, Walldorf (DE); Edward-Robert Tyercha, Heidelberg (DE); Andreas Tonder, Weinheim (DE)

(73) Assignee: SAP SE, Walldorf (DE)

( * ) Notice: Subject to any disclaimer, the term of this patent is extended or adjusted under 35 U.S.C. 154(b) by 673 days.

(21) Appl. No.: 14/973,596

(22) Filed: Dec. 17, 2015

(65) Prior Publication Data

US 2017/0177700 A1   Jun. 22, 2017

(51) Int. Cl.
*G06F 16/22* (2019.01)
*G06F 16/23* (2019.01)
*G06F 16/27* (2019.01)

(52) U.S. Cl.
CPC ........ *G06F 16/278* (2019.01); *G06F 16/2282* (2019.01); *G06F 16/2386* (2019.01)

(58) Field of Classification Search
CPC ......... G06F 17/30584; G06F 17/30339; G06F 17/30377; G06F 17/3038; G06F 17/30345; G06F 17/30336
See application file for complete search history.

(56) References Cited

U.S. PATENT DOCUMENTS

| 6,748,393 | B1 * | 6/2004 | Kapoor | G06F 17/30451 |
| 6,886,012 | B1 * | 4/2005 | Phoenix | G06F 17/30336 |
| | | | | 707/704 |
| 10,042,910 | B2 * | 8/2018 | Bensberg | G06F 17/30578 |
| 10,055,440 | B2 * | 8/2018 | Bensberg | G06F 17/30339 |
| 2005/0251511 | A1 * | 11/2005 | Shankar | G06F 17/30454 |
| 2012/0109892 | A1 * | 5/2012 | Novik | G06F 17/30566 |
| | | | | 707/633 |
| 2012/0143873 | A1 * | 6/2012 | Saadat | G06F 17/30321 |
| | | | | 707/741 |
| 2013/0151521 | A1 * | 6/2013 | Gislason | G06F 17/3071 |
| | | | | 707/737 |
| 2015/0120658 | A1 * | 4/2015 | Rath | G06F 17/30575 |
| | | | | 707/623 |
| 2015/0149413 | A1 * | 5/2015 | Lee | G06F 17/30345 |
| | | | | 707/643 |
| 2015/0309999 | A1 * | 10/2015 | Ng | G06F 17/30584 |
| | | | | 707/809 |
| 2016/0364424 | A1 * | 12/2016 | Chang | G06F 17/30377 |

* cited by examiner

*Primary Examiner* — Jesse P Frumkin
(74) *Attorney, Agent, or Firm* — Mintz Levin Cohn Ferris Glovsky and Popeo, P.C.

(57) ABSTRACT

An update to a partitioning column for a partitioned table in a database can be performed by handling rows for which the update will not require moving to a different partition separately (e.g. "locally") for each partition followed by re-inserting those rows that will require moving to a different partition and deleting them from the original partition. The re-inserted rows are directed to a correct partition by application of the partitioning criteria for the table. Methods, articles, and systems are described.

15 Claims, 4 Drawing Sheets

UPDATING A PARTITIONING COLUMN

TECHNICAL FIELD

The subject matter described herein relates to updating one or more values in a partitioning column, which is the column or one of the columns that are used as a partitioning key or criterion. The new value may require that the row has to be moved to another partition so that it fulfills the partitioning criteria or specification.

BACKGROUND

To maximize performance, optimize use of computing resources, and/or for various other reasons, modern software architectures frequently take advantage of multi-core CPUs and/or distributed processing systems by allowing parallel execution and with architectures that scale well with the number of cores and/or computing nodes. For data management systems, approaches to taking full advantage of parallel processing capabilities and main system memory available on a number of distributed systems can include partitioning of stored data into sections or "partitions" for which calculations can be executed in parallel and which can be stored and/or operated on across a distributed network of computing nodes.

A database program or database management system generally displays data as two-dimensional tables formed of columns and rows. However, data are typically stored as one-dimensional strings. A row-based store typically serializes the values in a row together, then the values in the next row, and so on, while a column-based store serializes the values of a column together, then the values of the next column, and so on.

Column-based storage can facilitate execution of operations in parallel using multiple processor cores and/or more than one computing node and can also enable efficient data storage. In a column store, data are already vertically partitioned, so operations on different columns can readily be processed in parallel. If multiple columns need to be searched or aggregated, each of these operations can be assigned to a different processor core or computing node. In addition, operations on a given column can be parallelized by partitioning the column into multiple sections that can be processed by different processor cores or computing nodes. Partitioning refers generally to splitting one or more columns of a column-store database table horizontally (e.g. by making one or more divisions along a vertical length of the column into two or more sub-columns or partitions). In this manner, large columns (or tables of more than one column) can be broken down into smaller, more manageable parts. For example, partitioning can be used to limit the amount of data to be loaded into memory at any given processing node or to be transferred between nodes. Partitioning is typically used in multiple-host systems, but it may also be beneficial in single-host systems.

Partitioning of a column can be based on specified criteria applied to split the database table. In general, a partitioning key is used to assign values in the column to a partition based on one or more criteria. Commonly used approaches include range partitioning, list partitioning, hash partitioning, round robin partitioning, and composite partitioning. In range partitioning, a partition can be defined by determining if the partitioning key is inside a certain range. For example, a partition can be created to include all rows in which values in a column containing postal codes are between 70000 and 79999. In list partitioning, a partition can be assigned a list of values and the partition can be chosen if the partitioning key has one of the values on the list. For example, a partition built to include data relating to Nordic countries can includes all rows in which a column of country names includes the text string values Iceland, Norway, Sweden, Finland, Denmark, etc. In hash partitioning, the value of a hash function can determine membership in a partition. For example, for a partitioning scheme in which there are four partitions, the hash function can return a value from 0 to 3 to designate one of the four partitions. Round robin partitioning can be used to distribute storage and/or processing loads among multiple data partitions and/or servers or server processes according to a pre-set rotation among the available partitions or servers or server processes. As an example, a first data unit can be directed to a first partition of three partitions, a second data unit to the second partition, a third data unit to the third partition, a fourth data unit to the first partition, and so forth. In composite partitioning, certain combinations of other partitioning schemes can be allowed, for example by first applying a range partitioning and then a hash partitioning.

SUMMARY

In one aspect, a method for implementation on one or more computing systems that include one or more programmable processors includes identifying a set of values in a partitioning column that will be updated by one or more operations of an update statement on a partitioned table (which is partitioned into a plurality of partitions via partitioning logic) in a database and determining which values of the set of values to be updated will remain in a same partition after being updated, the determining comprising evaluating the partitioning logic for the set of values to be updated. The method further includes executing the one or more operations of the update statement separately on each partition of the plurality of partitions that includes one or more of the values of the set of values that will remain in the partition after being updated, and deleting, from the plurality of partitions, a set of rows containing other values of the set of values to be updated that will require moving to a different partition of the plurality of partitions once updated. The set of rows is re-inserted into the database table such that the one or more operations of the update statement are executed for the set of rows and the partitioning logic directs each row of the set of rows to a proper partition.

In some variations one or more of the following features can optionally be included in any feasible combination. The re-inserting can further include including a statement identifier associated with each row of the set of rows. The statement identifier can indicate that a row with which it is associated has been operated on by the update statement. The executing of the one or more operations of the update statement separately on each partition can include not operating on rows comprising the statement identifier. The update statement can include one or more synchronization points, which can act to prevent the re-inserting until all partitions have had the one or more operations of the update statement locally executed. The set of rows can include a data package outputted by each partition, and the data packages can be not re-inserted until all partitions have completed separately updating. The update statement can include the one or more operations specified in a data manipulation language.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a database management system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
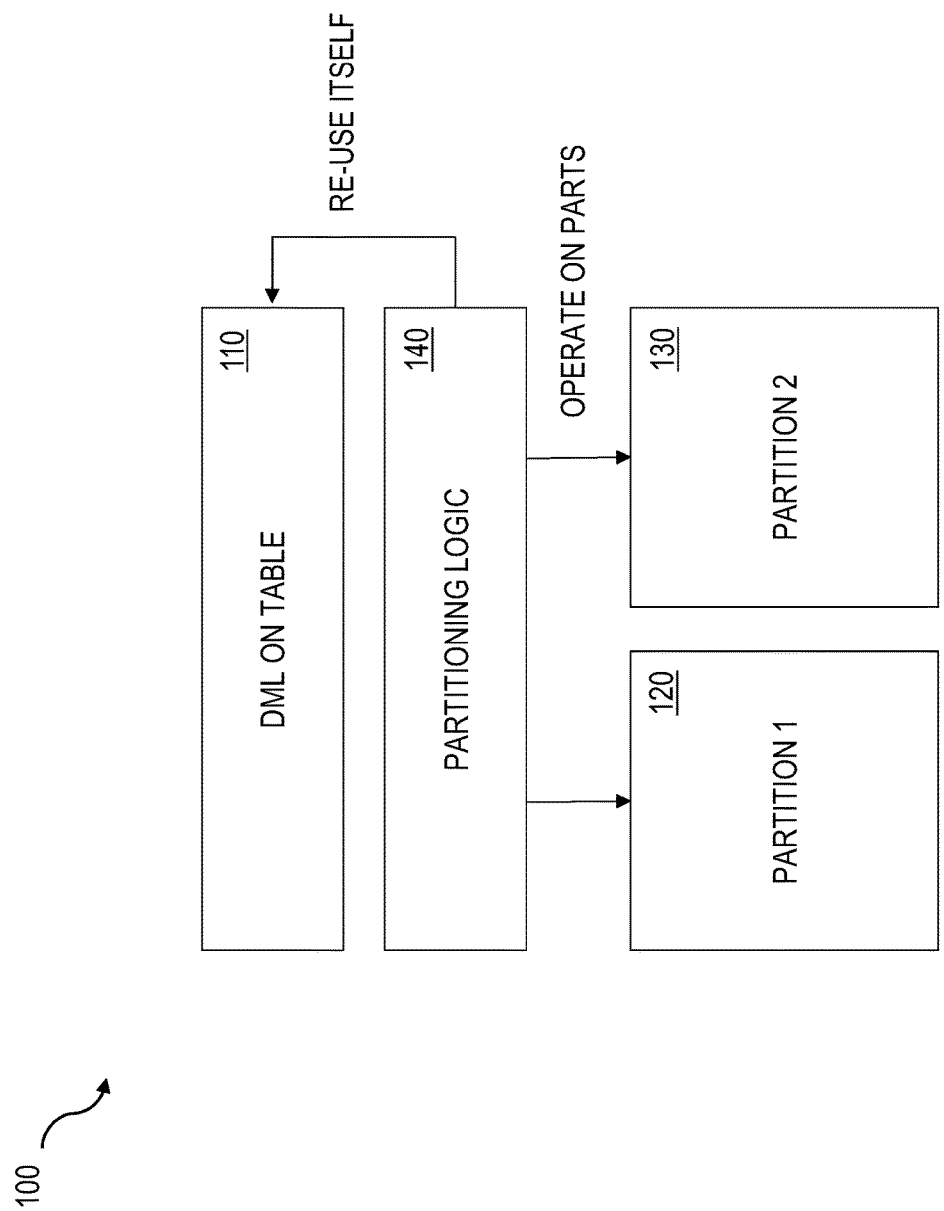
FIG. 1 shows a diagram illustrating an approach for updating a partitioned column.

When a value in a partitioning column is updated, the update may require relocation of the row to a different partition. For example, if a table is partitioned using range partitioning, with values for the partitioning column of 5 or less residing in a first partition and values greater than 5 residing in a second partition, an update to a value in the partitioning column (e.g. via operation of a database application, manual update of a value by a user, etc.) that changes the value from 4 to 6 would require that the row be moved from the first partition to the second partition to comply with the partitioning criteria or specification for the table.

In general, a check can be performed to determine whether the update results in the partition criteria remaining valid for the updated value in the partitioning column. If so, no action is necessary. However, if the update to the value results in the partitioning criteria no longer being valid (i.e. with the updated value in the partitioning column, the row is no longer in a "proper" partition but is instead in a "wrong" partition), it can be necessary to perform various operations to ensure that the updated row is located in the proper partition.

One example of an approach for making updates on a partitioning column can include moving all rows to be updated into a temporary table, performing the update, and then inserting the updated rows into the table such that the partitioning specification for the table directs each of the newly inserted rows into the appropriate partition according to one or more partitioning criteria. Such an approach can include several disadvantages, such as for example poor performance, complex handling issues with the temporary table, and potential difficulties with updating statements that act on a large number of rows (e.g. "set x=x+1") and that can effectively require that a great number of rows in the column be moved to temporary storage and then reinserted via the partitioning criteria.

A somewhat improved approach can include performing an update on the real data and allowing the update operation to identify all of the rows that were updated (e.g. by returning a RowID for each updated row). A search can then be performed to retrieve partitioning column data for the RowIDs of the updated rows in the column. Rows that no longer match the partitioning criteria (e.g. after the result of the update operations) are identified. The identified, mismatching rows are deleted from the "wrong" partition and re-inserted into the table such that the partitioning criteria are applied as though the rows are newly inserted, thereby directing these rows to the "proper" partition according to the partitioning criteria. While such an approach does improve on the use of a temporary table as in the earlier-described example, it can nonetheless introduce some difficulties in practical application. For example, an "aging" operation can include moving data from a "current" (or, in another example "hot") partition to a historical or archived (or, "cold") partition. Accordingly, all updated rows in the "current" partition are technically misplaced after the update, in which a set of rows in the "current" partition may be marked as "closed/old/ready for archiving" (e.g. because a sales transaction involving those data has been completed and its associated records therefore closed). The rows that are updated could directly be re-inserted into the proper historical partition (adjusting the partitioning column). Instead, the rows are updated locally in the current partition, which causes these rows to be copied into the delta index of the columnar storage. Subsequently, all of these rows are re-inserted into the historical partition, and next the rows that were just written into the delta of the current partition are deleted. Writing the rows into the delta can be expensive and memory-intense as the delta is a non-compressed, write-optimized store. Additionally, because the rows are deleted almost immediately, this writing operation is basically superfluous.

FIG. 1 shows a diagram 100 illustrating how this approach can operate on a column with two partitions. It will be understood that the illustrated example is simplified for clarity and a similar approach could apply for any number of two or more partitions. One or more data manipulation language (DML) operations 110 are performed on a table that includes one or more columns partitioned into two or more partitions 120, 130 based on partitioning logic 140 that includes one or more partitioning criteria. As described above, the DML operations 110 act on the real data in the column partitions 120, 130 as part of an update. As part of the DML operations, a record is retained of the RowID for all rows that were updated. A check of these rows is conducted to find those rows of the updated rows whose values no longer match the partitioning criteria in the partitioning logic 140. The identified rows are deleted via a delete DML operation 110 in the partition in which they currently reside, and then the rows are re-inserted to the table via an insert DML operation 110. In both DML statements, the partitioning logic 140 properly deletes and re-inserts rows by directing the call and data to a proper partition 120, 130.

Figure 2:
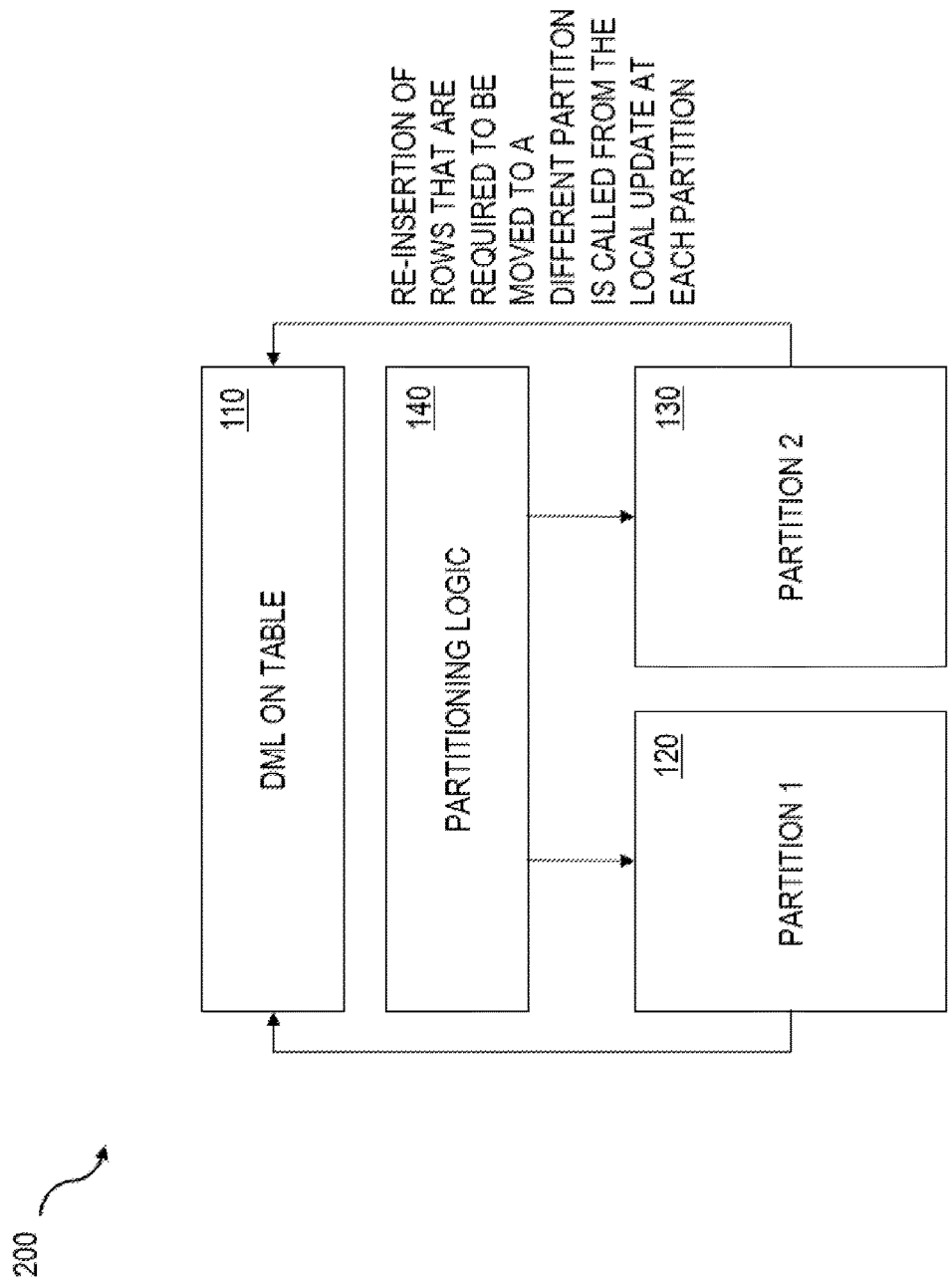
FIG. 2 shows a diagram illustrating another approach for updating a partitioned column.

FIG. 2 shows a diagram 200 illustrating an improved approach consistent with implementations of the current subject matter for updating a column with two partitions. As with the example of FIG. 1, it will be understood that the example of FIG. 2 is simplified for clarity and a similar approach could apply for any number of two or more partitions. Instead of initiating the update operations and assessing whether the rows are placed in the proper partitions later, as in the example of FIG. 1, the assessment is done as part of the actual update operation, on values in each of the partitions 120, 130 separately. This approach can include identifying a set of values in the partitions of the column that need to be written as part of the update and further determining which values of the set of values to be updated will remain in a same partition after being updated (e.g. those values that will still be in the proper partition according to the partitioning logic 140 after being updated to their new values). This determining can occur by evaluating the partitioning criteria to the values to be written as part of the update. For those rows that will be compatible with the partitioning criteria after the updating, the update operations are performed within the partitions in which they resided prior to the update. In other words, each partition can perform the update operations on itself for those values in rows that will not need to be moved to another partition as a result of the update. The partitions can be directed to do this by the partitioning logic 140. However, unlike the example of FIG. 1, the determination of whether the row may stay local (e.g. in its current partition) or needs to be moved is not performed centrally in the partition logic 140, but instead directly within the updates on the partitions 120 and 130 respectively, For those rows that will require moving to another partition after the updating, a new insert operation is executed, for example by passing these rows back to the DML operations 110 (for the update to occur) and then to the partitioning logic 140 for directing of each row to a proper partition 120, 130. At each partition 120, 130, the new row is inserted into the delta index for the respective target partition. This operation is followed by a deletion of the row from its original partition via application of the DML operations 110 and the partitioning logic 140. In an alternative implementation, the update logic on the partitions 120 and 130 not only identifies that a row has to be moved and re-inserts it, but also immediately deletes the row by marking it as invisible. In this manner, the update operation can perform the actual deletion that is usually only carried out by the deletion operation.

Consistent with implementations of the current subject matter, additional features can be included to prevent a race condition in which an insert operation for rows to be moved from a first partition 120 occurs before the local update on a second partition 130 is completed. Such a situation can potentially lead to the newly inserted rows in the second partition 130 being acted upon a second time, thereby leading to errors. Additionally, if a second update is commenced before a first update is completed the second update may not see all rows and/or values in some of the partitions, which can also lead to errors.

This issue can be understood with reference to the example partitioning criteria described above (e.g. values for the partitioning column of 5 or less residing in a first partition 120 and values greater than 5 residing in a second partition 130). When a row has the value x=5 in the partitioning column, the row resides in the first partition 120. An update with expression "x=x+1" performed on the first partition 120 results in that row, which will have the new value x=6 in the partitioning column, needs to be inserted into the second partition 130. When the update on the second partition 130 is performed, it may attempt to update the row with value x=6 to x=7.

One approach to avoiding this kind of situation can include the use of a statement identifier that is associated with rows that are inserted as part of a current update statement. When the local updating is occurring on a partition, its effect can be limited to not affect any data that includes this identifier such that a row is not inadvertently updated twice.

Another approach can include the use of synchronization points. For example, an update on a column or table with multiple partitions can require that all of the partitions complete the local update process before commencing the insert operations for the rows that are required to be moved to a different partition. These synchronization points can be specified as part of a set of plan operations associated with an update statement. Using the synchronization point approach, each partition can output a data package that is to be inserted (e.g. into other partitions via the partitioning login 140), and these packages can be executed only after all of the local update operations are completed. In this manner, the execution plan for an update can include a first set of operations that include the local update, deletion, and outputting of a data package including the rows to be reinserted, and a second set of operations that include performing the insertion of the outputted data packages.

Figure 3:
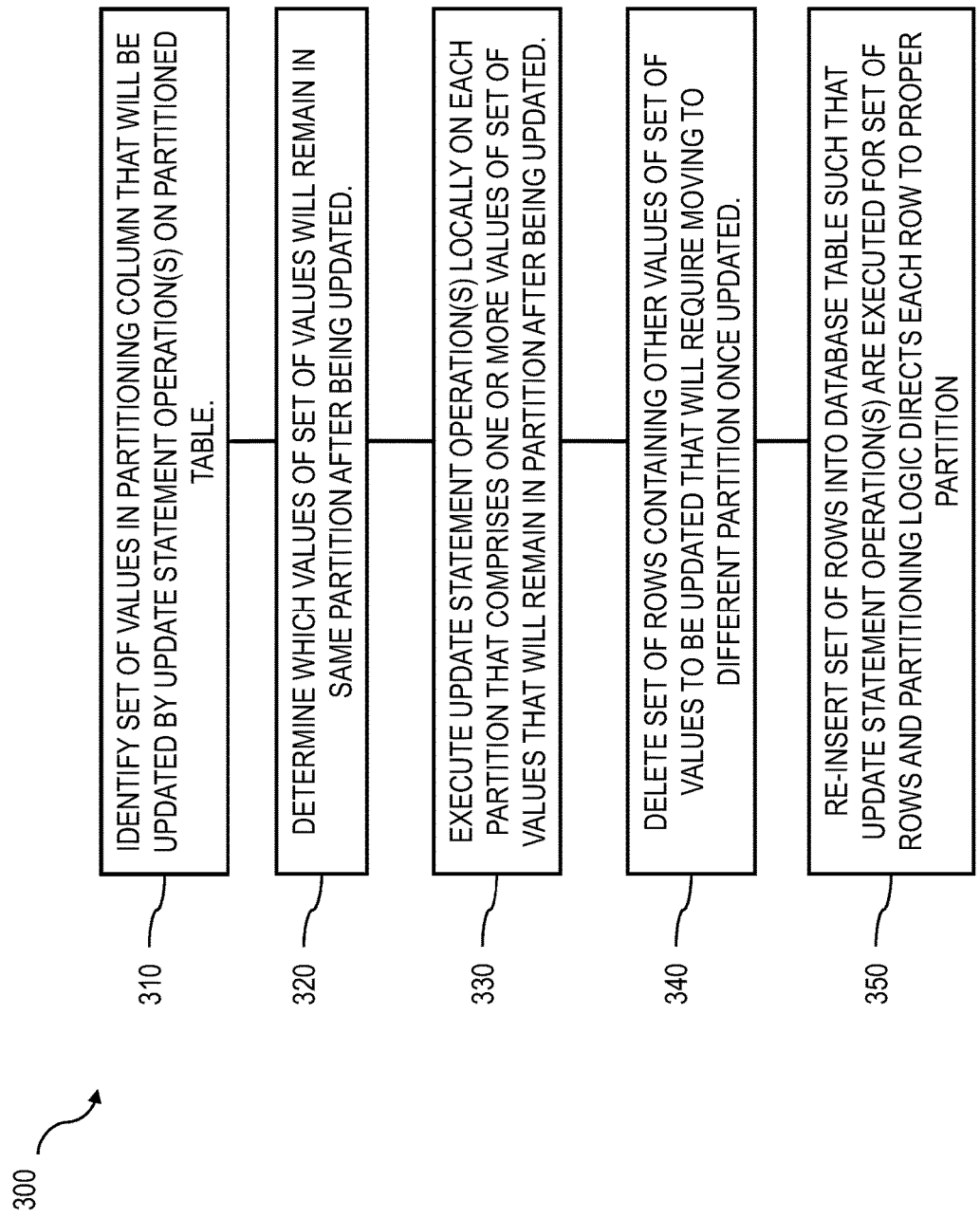
FIG. 3 shows a process flow diagram illustrating aspects of a method having one or more features consistent with implementations of the current subject matter.

FIG. 3 shows a process flow chart 300 illustrating features of a method consistent with implementations of the current subject matter. At 310, a set of values in a partitioning column that will be updated by one or more operations of an update statement on a partitioned table in a database is identified. The partitioned table is partitioned into a plurality of partitions via partitioning logic as noted above.

At 320, a determination is made of which values of the set of values to be updated will remain in a same partition after being updated. The determining includes evaluating the partitioning logic for the set of values to be updated. The one or more operations of the update statement are executed at 330 locally on each partition of the plurality of partitions that comprises one or more of the values of the set of values that will remain in the partition after being updated, and at 340 a set of rows containing other values of the set of values to be updated that will require moving to a different partition of the plurality of partitions once updated, is deleted from the plurality of partitions. At 350, the set of rows is re-inserted into the database table such that the one or more operations of the update statement are executed for the set of rows and the partitioning logic directs each row of the set of rows to a proper partition.

Figure 4:
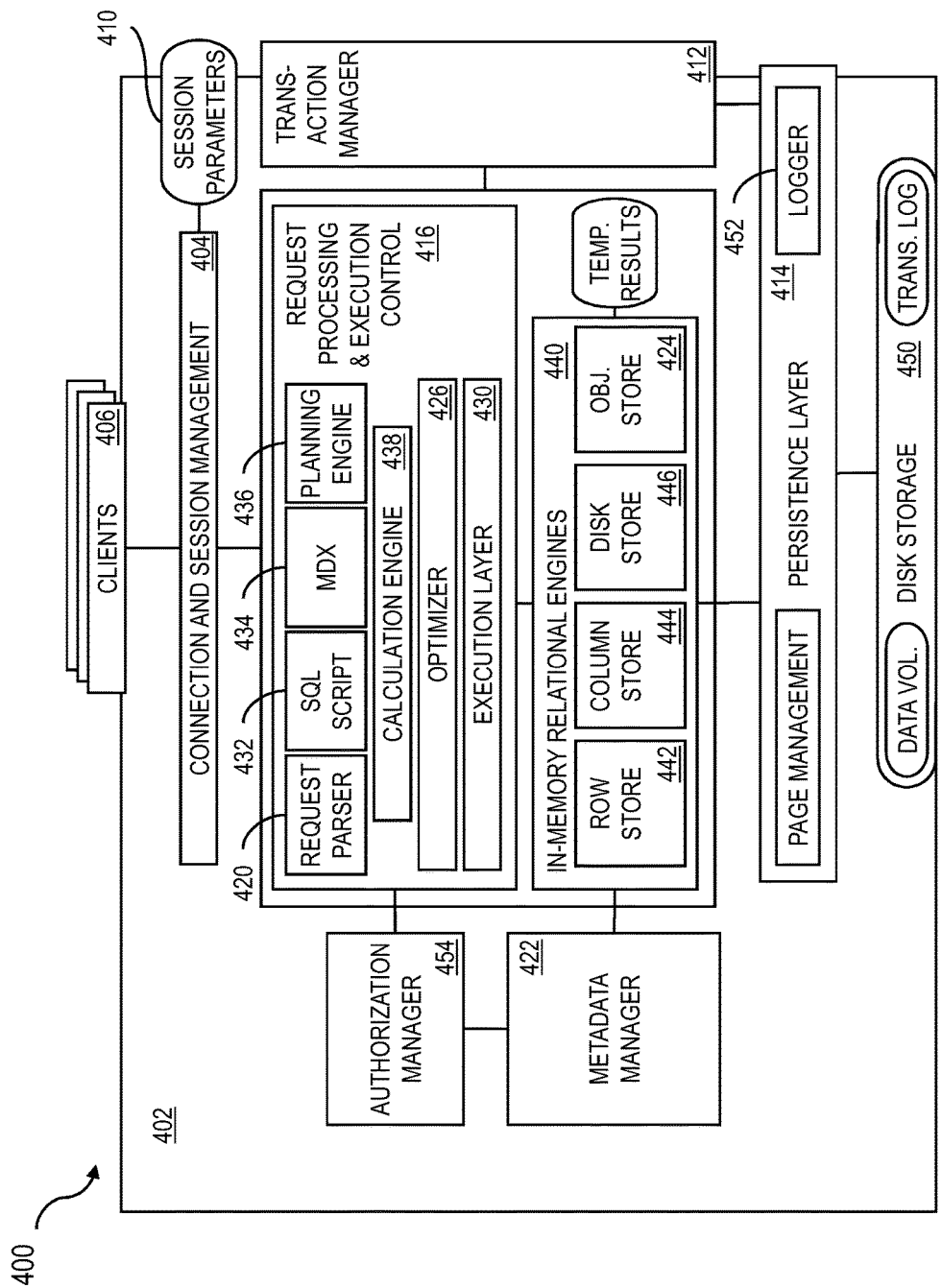
FIG. 4 shows a diagram illustrating features of a database management system architecture consistent with at least some implementations of the current subject matter.

FIG. 4 shows a diagram illustrating features of an example environment in which the subject matter described herein can be implemented. It will be appreciated that other environments can be utilized including variations of the environments illustrated in FIG. 4. In particular, FIG. 4 shows a block diagram of an in-memory relational database server 400 consistent with some implementations of the current subject matter. The in-memory relational database server 400 can be implemented on one or more computing systems that include one or more programmable processors (e.g. physical, hardware-based processors). A connection and session management component 402 of an in-memory database system 404 creates and manages sessions and connections for the database clients 406. For each session, a set of parameters 410 is maintained, such as for example auto commit settings or the current transaction isolation level. Once a session is established, database clients 406 can use logical (e.g. SQL) statements to communicate with the in-memory database system 404. For analytical applications, the multidimensional query language MDX can also be supported.

Each statement can be processed in the context of a transaction. New sessions can be implicitly assigned to a new transaction. A transaction manager 412 can coordinate transactions, control transactional isolation, and keep track of running and closed transactions. When a transaction is committed or rolled back, the transaction manager 412 can inform the involved engines about this event so they can execute necessary actions. The transaction manager 412 can cooperate with a persistence layer to achieve atomic and durable transactions.

Requests received from the database clients 406 can be analyzed and executed by a set of request processing and execution control components 416, which can include a request parser 420 that analyses a request from a database client 406 and dispatches it to a responsible component. Transaction control statements can, for example, be forwarded to the transaction manager 412, data definition statements can be dispatched to a metadata manager 422 and object invocations can be forwarded to an in-memory object store 424. Data manipulation statements can be forwarded to an optimizer 426, which creates an optimized execution plan that is provided to an execution layer 430. The execution layer 430 can act as a controller that invokes the different engines and routes intermediate results to a next phase in execution of the execution plan.

Built-in support can be offered for domain-specific models (such as for financial planning) scripting capabilities that allow to run application-specific calculations inside an in-memory database system. A scripting language, for example SQL Script 432, which is based on side effect free functions that operate on tables using SQL queries for set processing, can be used to enable optimizations and parallelization. The MDX language 434 can be used to provide support for multidimensional queries. A planning engine 436 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 432, MDX 434, and planning engine 436 operations can be implemented using a common infrastructure called a calculation engine 438. Metadata can be accessed via the metadata manager component 422. Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 422.

One or more relational engines 440, for example an in-memory row store 442, an in-memory column store 444, a disk-based store 446, and the in-memory object store 424 mentioned above can communicate with the request processing and execution control components 416, the metadata manager 422, and the in-memory persistence layer 414. The row store 442 and column store 444 are each relational in-memory data engines that can store data in a row-based or column-based way, respectively. Some data, such as for example tracing data, need not be kept in memory all the time. The disk-based store 446 can handle such data. Data in the disk-based store 146 can be primarily stored in disk storage 450 and only moved to memory buffers (e.g. the persistence layer 414) when accessed.

When a table is created, the table can be specified in the store in which it is located. Tables can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 414 can be responsible for durability and atomicity of transactions and can ensure that the database is restored to the most recent committed state after a restart and that transactions are either completely executed or completely undone. To achieve this goal in an efficient way, the persistence layer 414 can use a combination of write-ahead logs, shadow paging and save points. The persistence layer 414 can offer interfaces for writing and reading data and can also contain a logger 452 that manages the transaction log. Log entries can be written implicitly by the persistence layer 414 when data are written via a persistence interface or explicitly by using a log interface.

An authorization manager 454 can be invoked by other components of the architecture to check whether a user has the required privileges to execute the requested operations.

Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could, for example, be used to restrict access to a cube with sales data to values with dimension attributes such as region="US" and year="2010."

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   identifying a set of values in a partitioning column that will be updated by one or more operations of an update statement on a partitioned table in a database, the partitioned table being partitioned into a plurality of partitions via partitioning logic;
   determining which values of the set of values to be updated will remain in a same partition after being updated, the determining comprising evaluating the partitioning logic for the set of values to be updated;
   executing the one or more operations of the update statement separately on each partition of the plurality of partitions that comprises one or more of the values of the set of values that will remain in the partition after being updated;

deleting, from the plurality of partitions, a set of rows containing other values of the set of values to be updated that will require moving to a different partition of the plurality of partitions once updated; and re-inserting the set of rows into the database table such that the one or more operations of the update statement are executed for the set of rows and the partitioning logic directs each row of the set of rows to a proper partition;

wherein the update statement comprises one or more synchronization points, the one or more synchronization points acting to prevent the re-inserting until all partitions have had the one or more operations of the update statement locally executed.

2. A computer program product as in claim 1, wherein the re-inserting further comprises including a statement identifier associated with each row of the set of rows, the statement identifier indicating that a row with which it is associated has been operated on by the update statement.

3. A computer program product as in claim 2, wherein the executing of the one or more operations of the update statement separately on each partition comprises not operating on rows comprising the statement identifier.

4. A computer program product as in claim 1, wherein the set of rows comprises a data package outputted by each partition, and wherein the data packages are not re-inserted until all partitions of the plurality of partitions have completed separately updating.

5. A computer program product as in claim 1, wherein the update statement comprises the one or more operations specified in a data manipulation language.

6. A method for implementation by one or more data processors forming part of at least one computing system, the method comprising:

identifying a set of values in a partitioning column that will be updated by one or more operations of an update statement on a partitioned table in a database, the partitioned table being partitioned into a plurality of partitions via partitioning logic;

determining which values of the set of values to be updated will remain in a same partition after being updated, the determining comprising evaluating the partitioning logic for the set of values to be updated;

executing the one or more operations of the update statement separately on each partition of the plurality of partitions that comprises one or more of the values of the set of values that will remain in the partition after being updated;

deleting, from the plurality of partitions, a set of rows containing other values of the set of values to be updated that will require moving to a different partition of the plurality of partitions once updated; and re-inserting the set of rows into the database table such that the one or more operations of the update statement are executed for the set of rows and the partitioning logic directs each row of the set of rows to a proper partition;

wherein the update statement comprises one or more synchronization points, the one or more synchronization points acting to prevent the re-inserting until all partitions have had the one or more operations of the update statement locally executed.

7. A method as in claim 6, wherein the re-inserting further comprises including a statement identifier associated with each row of the set of rows, the statement identifier indicating that a row with which it is associated has been operated on by the update statement.

8. A method as in claim 7, wherein the executing of the one or more operations of the update statement separately on each partition comprises not operating on rows comprising the statement identifier.

9. A method as in claim 6, wherein the set of rows comprises a data package outputted by each partition, and wherein the data packages are not re-inserted until all partitions of the plurality of partitions have completed separately updating.

10. A method as in claim 6, wherein the update statement comprises the one or more operations specified in a data manipulation language.

11. A system comprising:

computer hardware comprising a programmable processor, the computer hardware being configured to perform operations comprising:

identifying a set of values in a partitioning column that will be updated by one or more operations of an update statement on a partitioned table in a database, the partitioned table being partitioned into a plurality of partitions via partitioning logic;

determining which values of the set of values to be updated will remain in a same partition after being updated, the determining comprising evaluating the partitioning logic for the set of values to be updated;

executing the one or more operations of the update statement separately on each partition of the plurality of partitions that comprises one or more of the values of the set of values that will remain in the partition after being updated;

deleting, from the plurality of partitions, a set of rows containing other values of the set of values to be updated that will require moving to a different partition of the plurality of partitions once updated; and re-inserting the set of rows into the database table such that the one or more operations of the update statement are executed for the set of rows and the partitioning logic directs each row of the set of rows to a proper partition;

wherein the update statement comprises one or more synchronization points, the one or more synchronization points acting to prevent the re-inserting until all partitions have had the one or more operations of the update statement locally executed.

12. A system as in claim 11, wherein the re-inserting further comprises including a statement identifier associated with each row of the set of rows, the statement identifier indicating that a row with which it is associated has been operated on by the update statement.

13. A system as in claim 12, wherein the executing of the one or more operations of the update statement separately on each partition comprises not operating on rows comprising the statement identifier.

14. A system as in claim 12, wherein the set of rows comprises a data package outputted by each partition, and wherein the data packages are not re-inserted until all partitions of the plurality of partitions have completed separately updating.

15. A system as in claim 12, wherein the update statement comprises the one or more operations specified in a data manipulation language.

* * * * *